UNITED STATES PATENT OFFICE.

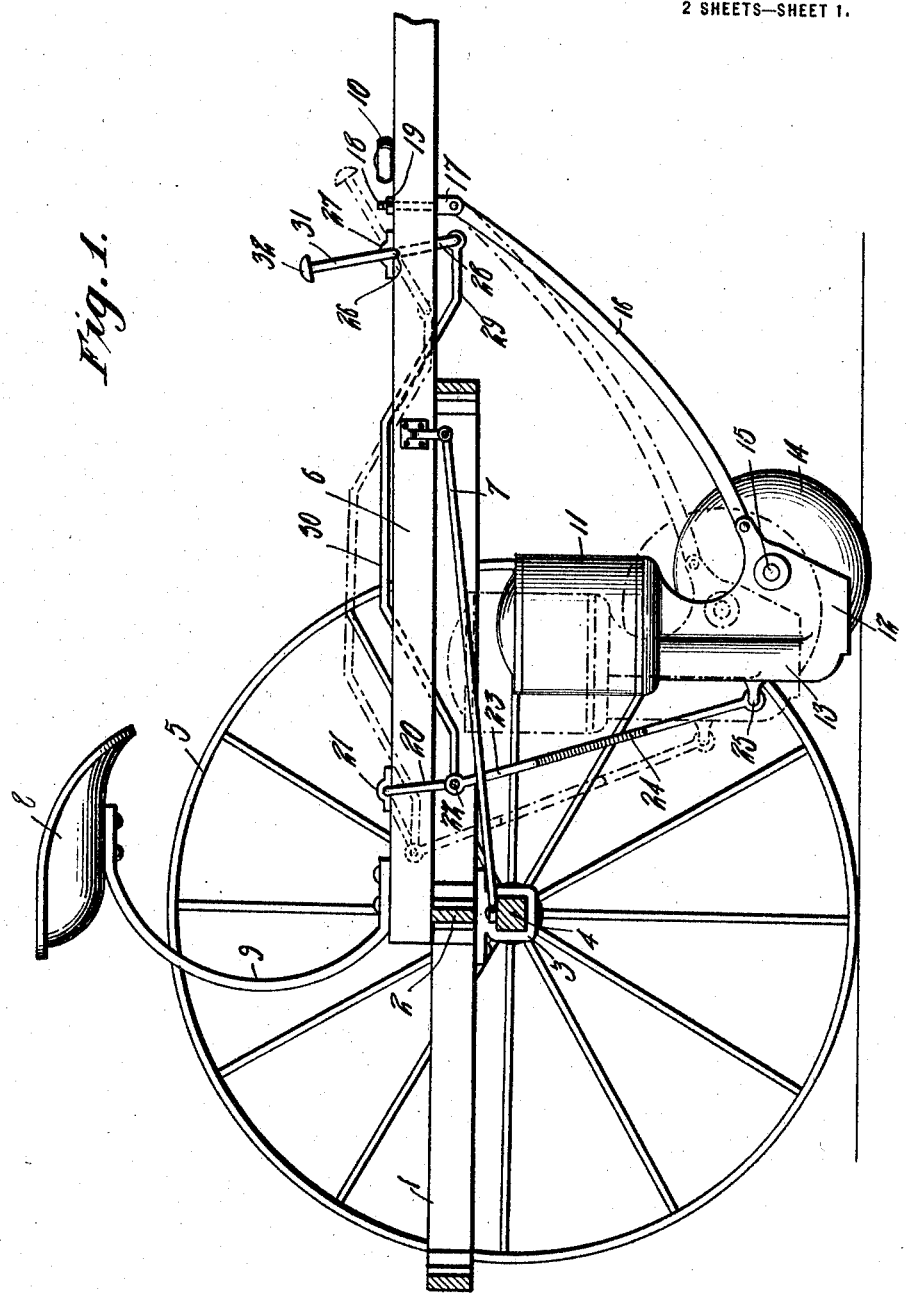

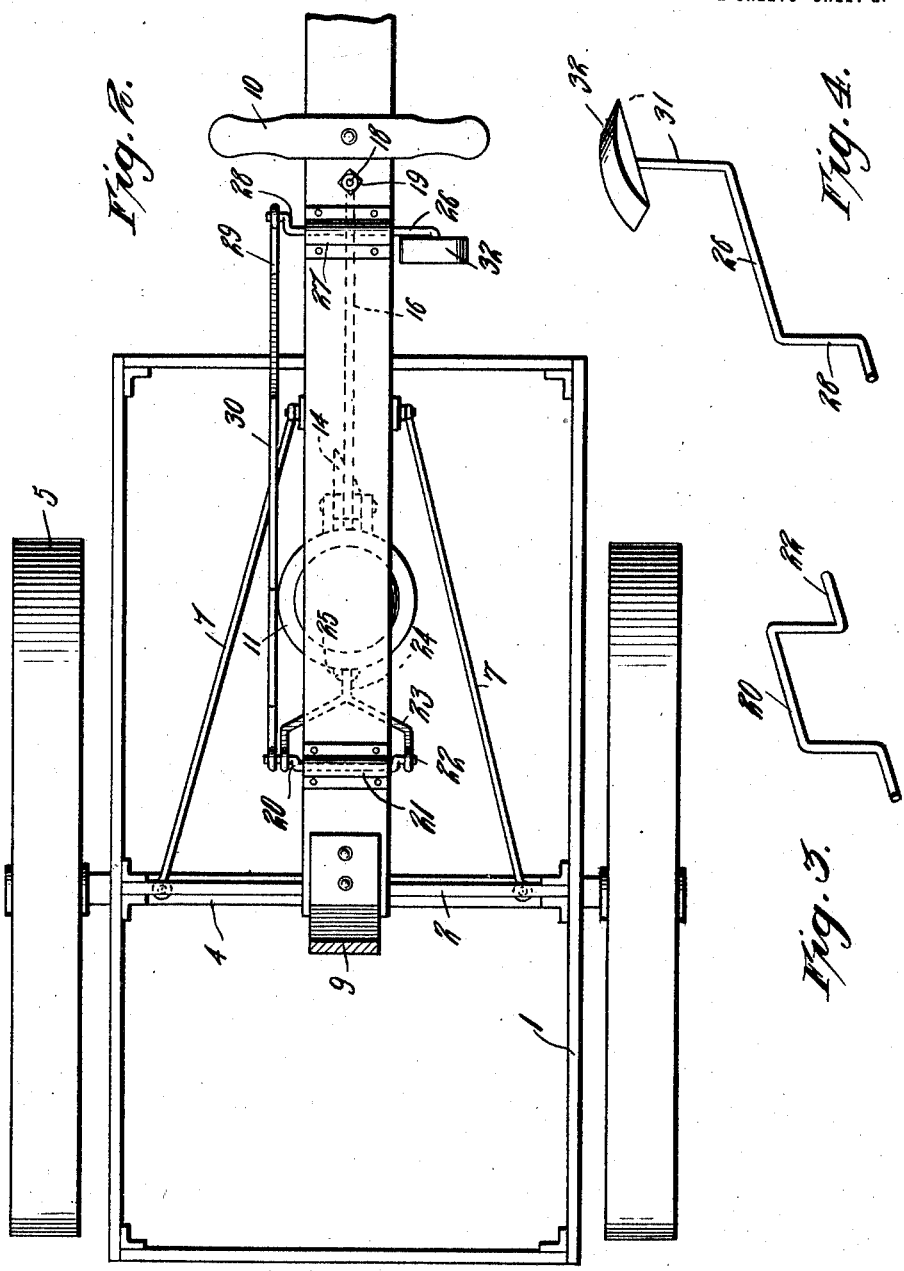

AUGUST BLASING, OF MANHATTAN, KANSAS.

REPLANTER.

1,315,276.	Specification of Letters Patent.	Patented Sept. 9, 1919.

Application filed October 23, 1916. Serial No. 127,237.

*To all whom it may concern:*

Be it known that I, AUGUST BLASING, a citizen of the United States, residing at Manhattan, in the county of Riley and State of Kansas, have invented certain new and useful Improvements in Replanters, of which the following is a specification.

This invention has reference generally, to disk cultivators and more particularly relates to a novel replanter.

As its primary aim and object, the present invention contemplates the provision of a device that is adapted to be used for traveling over a corn field having means thereon whereby the ground engaging means may be lowered into an operative position at predetermined times for replanting corn in places where the first planting of seed has not grown.

It is an equally important object of this invention to provide replanting means of the character mentioned to be used in combination with a disk cultivator in such a manner that the soil may be treated in two different manners by the one device, namely the cultivating of the soil and the arrangement whereby seed may be dropped into barren rows to consequently increase the production of the corn.

A more specific object of the invention resides in the provision of the arrangement of the shafts, levers and rods, which constitute the lifting means, whereby the seed box and disk may be raised and lowered.

Among the other aims and objects of the invention may be recited the provision of a device of the character mentioned with a view to compactness, the number of parts of which are few, the construction simple, the cost of production low, and the efficiency high.

Other improvements and novel details in the construction and arrangement of parts will be appreciated from the detailed description below, which is to be read in connection with the accompanying drawings forming a part hereof, and wherein I disclose a preferred embodiment of the invention for the purpose of illustration.

The invention is clearly illustrated in the accompanying drawings in which:—

Figure 1 is a side elevation of my invention.

Fig. 2 is a top plan thereof.

Fig. 3 is an enlarged perspective detail.

Fig. 4 is an enlarged perspective detail.

Similar characters of reference are employed in all of the above described views, to indicate corresponding parts.

Referring now, more particularly, to the accompanying drawings, I provide a frame 1 braced by a cross bar 2, brackets 3 being connected to the undersurface of the sides of the frame to support an axle 4 on the respective projecting ends of which are rotatably mounted ground wheels 5. A tongue 6 is supported on the cross piece 2 and on the front end of the frame and extends longitudinally therefrom being supported in this position through the medium of suitable braces 7 connected on opposite sides at a point adjacent the engagement of the tongue with the front end of the frame, said braces extending rearwardly in divergent relation and rigidly yet removably connected in any suitable manner to the axle 1 adjacent the sides of the frame as illustrated in Fig. 2 of the accompanying drawings. A seat 8 is yieldingly mounted on the inner end of the tongue by means of a seat support 9 while a foot rest 10 is arranged transversely of and rigidly secured to the tongue at a point in advance of the front end of the frame. It is to be understood that the construction above set forth forms no essential part of this invention and broadly resembles a Moline type but it is desired that the portions be slightly smaller than the standard size in order that the device may be used to greater advantage, since the standard size will not go between the furrows in the ground. Connected to the tongue is my improved replanting means.

In the present instance the replanting means may be said to be in the form of an attachment and consists of a seed box 11 from which depends a bifurcated shoe 12 while the rear edge of the shoe is constructed to provide a seed dispensing chute 13. A harrow disk 14 is rotatably mounted adjacent the bifurcated portions of the shoe by means of a stub shaft 15. A lead bar 16 has its respective ends pivoted to the shoe and to a securing device 17, the shank 18 of which is desirably anchored on the tongue by means of a nut 19 at a point slightly in the rear of the foot rest 10. A crank shaft 20 is straddled about the rear end of the tongue the crank portion being journaled on the upper surface of the tongue by means of a suitable bearing 21 while the projecting ends 22 of the crank shaft are pivotally engaged by the forked end 23 of a rod 24 the lower end of which is pivoted to the chute 13 as indicated by the numeral 25. In order to raise the disk 14 from engagement with the ground, I have rockably mounted a shaft 26 on the tongue adjacent the securing device 17 by means of a suitable bearing 27. A crank 28 extends from one end of the shaft while a connecting rod 29 which may be and preferably is bent intermediate its ends as indicated by the numeral 30 so as to straddle one of the braces has the respective ends pivotally mounted about the crank 28 and one projecting end 22 of the crank shaft 21. A foot lever 31 extends from the opposite end of the shaft 26 while a foot engaging portion 32 is carried by the outer end of the lever 31.

The mode of operation of the invention may be reviewed as follows:—

It is apparent that when the lever 31 is pressed outwardly and downwardly the connecting rod 29 will move rearwardly and rock or move the crank shaft 21 rearwardly and upwardly to consequently cause the rod 24 to exert an upward pull on the chute and thereby raise the disk from engagement with the ground. Of course while the foot of the operator is engaged on this lever 32 the device will be maintained in a raised position, however when the driver approaches a barren spot, at a predetermined time he will release the lever 31 to allow the disk 14 to engage the ground. I have not shown any means for dropping seed from the box 11 as any conventional form can be used and operated when desired. The disk as will be noted cultivates the ground and when seed is dispensed it is obvious that the soil is treated in two different manners by this one device.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. A replanter comprising in combination with a supporting frame having a tongue extending therefrom, a rod rotatably mounted on the tongue and having a crank arm formed on each end and extending down the sides of the tongue, a Y-shaped rod pivotally connected to the crank arms of the rotatable rods, a lead rod pivotally connected to the tongue, a distributing shoe carried by the lower ends of the Y-shaped rod and lead rod, a feed box carried by the shoe, and means for rotating the rotatable rod for raising and lowering the shoe and feed box.

2. A replanter comprising in combination with a supporting frame having a tongue extending therefrom, a rod rotatably mounted on the tongue and having a crank arm formed on each end and extending down the sides of the tongue, a Y-shaped rod pivotally connected to the crank arms of the rotatable rod, a lead rod pivotally connected to the tongue, a distributing shoe carried by the lower ends of the Y rod and lead rod, a feed box carried by the shoe, a vertical disk rotatably mounted on one side of the shoe, a lever pivotally connected to the tongue, and a rod connecting the lower end of the lever and one crank arm of the rotatable rod for raising and lowering the distributing shoe, feed box, and disk, when the lever is operated.

In testimony whereof I affix my signature in presence of two witnesses.

AUGUST BLASING.

Witnesses:
 WILLIAM TAYLOR,
 CHARLES HUGHES.

Copies of this patent may be obtained for five cents each, by addressing the "Commissioner of Patents, Washington, D. C."